United States Patent
Lin (10) Patent No.: US 12,439,273 B2
(45) Date of Patent: Oct. 7, 2025

(54) WIRELESS COMMUNICATION METHOD AND DEVICE

(71) Applicant: GUANGDONG OPPO MOBILE TELECOMMUNICATIONS CORP., LTD., Dongguan (CN)

(72) Inventor: Xue Lin, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 423 days.

(21) Appl. No.: 17/989,848

(22) Filed: Nov. 18, 2022

(65) Prior Publication Data

US 2023/0077850 A1  Mar. 16, 2023

Related U.S. Application Data (63) Continuation of application No. PCT/CN2020/108621, filed on Aug. 12, 2020.

(51) Int. Cl.
*H04W 16/26* (2009.01)
*H04W 24/02* (2009.01)

(52) U.S. Cl.
CPC ........... *H04W 16/26* (2013.01); *H04W 24/02* (2013.01)

(58) Field of Classification Search
CPC .............................. H04W 16/26; H04W 24/02
See application file for complete search history.

(56) References Cited

U.S. PATENT DOCUMENTS

| | | | |
|---|---|---|---|
| 9,392,432 | B2 | 7/2016 | Karaman et al. |
| 10,237,041 | B2 | 3/2019 | Xu et al. |
| 2020/0120724 | A1* | 4/2020 | Vaidya ................. H04W 48/16 |

FOREIGN PATENT DOCUMENTS

| | | | |
|---|---|---|---|
| CN | 101594681 A | 12/2009 | |
| CN | 106454890 A | 2/2017 | |
| CN | 110890632 A | 3/2020 | |
| CN | 111371754 A | 7/2020 | |
| WO | 2014154277 A1 | 10/2014 | |
| WO | WO2018031136 | * 2/2018 | ............ H04W 74/00 |

OTHER PUBLICATIONS

QUALCOMM INC: "Coverage and Capacity Optimization", 3GPP Draft, RS-204803, Aug. 6, 2020 (QUALCOMM INC). (Year: 2020).*
Extended European Search Report dated Jun. 13, 2023 received in European Patent Application No. EP20949012.7.

(Continued)

*Primary Examiner* — Myron Wyche
(74) *Attorney, Agent, or Firm* — Sheppard, Mullin, Richter & Hampton LLP (57) ABSTRACT

Provided are a wireless communication method and device. The method includes: transmitting, by a first access network device, a first message including a coverage modification list to a second access network device through at least one of an Xn interface, an NG interface, and an S1 interface. The first access network device transmits the first message to the second access network device based on the Xn interface, the NG interface, and the S1 interface.

12 Claims, 3 Drawing Sheets

(56) References Cited

OTHER PUBLICATIONS

QUALCOMM INC :"Coverage and Capacity Optimization"3GPP Draft; R3-204803, 3rd Generation Partnership Project (3GPP), Mobile Competence Centre ; 650, Route Des Lucioles ; F-06921 Sophia-Antipolis Cedex) France, vol. RAN WG3, No. E-Meeting; Aug. 17, 2020-Aug. 28, 2020,Aug. 6, 2020 (Agu. 6, 2020),XP051915665, 4 pages.
International Search Report and Written Opinion dated Apr. 29, 2021 in International Application No. PCT/CN2020/108621. English translation attached.
Ericsson. "AAS cell configuartion change notification", 3GPP TSG-RAN3 Meeting #87bis R3-151050, Apr. 20, 2015 (Apr. 20, 2015), sections 8.3.5-9.1.2.8.
3GPP, "Evolved Universal Terrestrial Radio Access (E-UTRA) and Evolved Universal Terrestrial Radio Access Network (E-UTRAN)", 3GPP TS 36.300 V15.3.0, Sep. 2018(Sep. 2018), Overall description, Stage 2(Release 15).
3GPP, "Evolved Universal Terrestrial Radio Access Network(E-UTRAN)" 3GPP TS 36.423 V16.1.0, Mar. 2020 (Mar. 2020), X2AP, (Release 16).
Office Action issued by the China Patent Office for Application No. 202310139022.5 mailed on Jun. 17, 2025.
Ericsson, "XnAP NR CCO support", 3GPP TSG-RAN WG3 Meeting #109-e, R3-205016, Aug. 17-28, 2020.

\* cited by examiner

FIG. 1

Transmitting, by a first access network device, a first message comprising a coverage modification list to a second access network device through at least one of an Xn interface, an NG interface, and an S1 interface — S210

Receiving, by a second access network device, a first message comprising a coverage modification list from a first access network device through at least one of an Xn interface, an NG interface, and an S1 interface

WIRELESS COMMUNICATION METHOD AND DEVICE

CROSS-REFERENCE TO RELATED APPLICATION

The present application is a continuation of International Patent Application No. PCT/CN2020/108621, filed on Aug. 12, 2020, the entire disclosure of which is hereby incorporated by reference in its entirety.

FIELD

Embodiments of the present disclosure relate to the field of communications, and more particularly, to a wireless communication method and device.

BACKGROUND

In Long Term Evolution (LTE), Coverage and Capacity Optimization (CCO) improves network coverage and capacity performances by adjusting transmission parameters of antennas of a cell such as angle and power. For example, if a hotspot area is located close to the cell boundary, the interference between cells will increase, thereby affecting the use efficiency and capacity of wireless resources. Based on this, the cell where the hotspot area is located needs to adjust the coverage thereof. Correspondingly, after receiving information about the adjustment of the coverage of the cell where the hotspot area is located, a neighboring cell also needs to adjust the coverage thereof.

However, CCO in LTE needs to introduce special Operation Administration and Maintenance (OAM) equipment, which increases the cost of optimization. In addition, due to its introduction of beamforming technology, the 5th-generation mobile communication technology (5G) has more flexible cell coverage pattern than LTE. Consequently, CCO in LTE is no longer suitable for 5G scenarios.

SUMMARY

The present disclosure provides a wireless communication method and device, which can not only reduce the optimization cost of CCO, but also apply to different communication scenarios to improve the applicability of CCO.

In a first aspect, a wireless communication method is provided. The method includes: transmitting, by a first access network device, a first message including a coverage modification list to a second access network device through at least one of an Xn interface, an NG interface, and an S1 interface.

In a second aspect, a wireless communication method is provided. The method includes: receiving, by a second access network device, a first message including a coverage modification list from a first access network device through at least one of an Xn interface, an NG interface, and an S1 interface.

In a third aspect, an access network device is provided. The access network device includes a memory for storing a computer program and a processor configured to invoke and execute the computer program stored in the memory, to perform the method according to the first aspect or implementations thereof.

In a fourth aspect, an access network device is provided. The access network device includes a memory for storing a computer program and a processor configured to invoke and execute the computer program stored in the memory, to perform the method according to the second aspect or implementations thereof.

DETAILED DESCRIPTION

The technical solutions in the embodiments of the present disclosure will be described below with reference to the figures in the embodiments of the present disclosure. Obviously, the described embodiments are only some embodiments, rather than all embodiments, of the present disclosure. All other embodiments obtained by those skilled in the art based on the embodiments in the present disclosure without inventive efforts are to be encompassed by the scope of the present disclosure.

Figure 1:
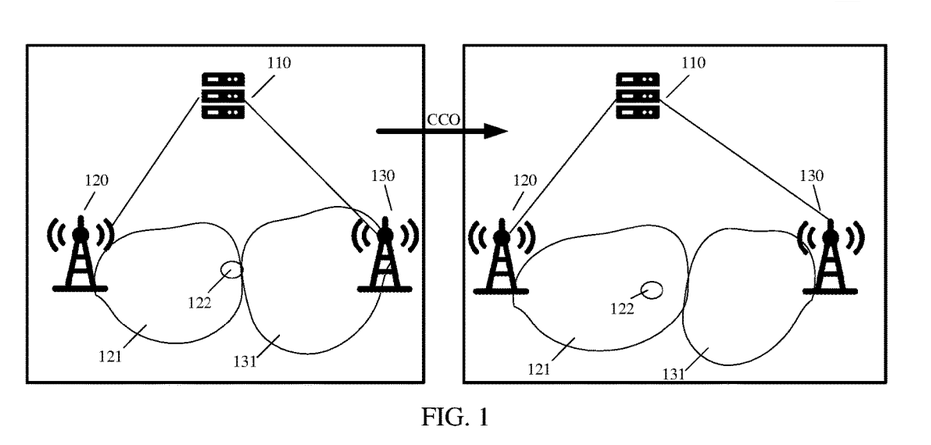
FIG. 1 is an example of an application scenario according to an embodiment of the present disclosure.

FIG. 1 is a schematic diagram of an application scenario according to an embodiment of the present disclosure.

As illustrated in FIG. 1, a communication system 100 may include an access network device 120 and an access network device 130 which may exchange messages via an Xn interface. The access network device 120 and the access network device 130 may each communicate with a terminal device via an air interface.

It should be understood that embodiments of the present disclosure are only exemplified by the communication system 100, but are not limited thereto. That is, the technical solution of the embodiments of the present disclosure can be applied to various communication systems, such as Long Term Evolution (LTE) system, LTE Time Division Duplex (TDD) system, Universal Mobile Telecommunications System (UMTS), 5G communication system (also called New Radio (NR) communication system), or future communication systems, etc.

As illustrated in FIG. 1, the access network device 120 and the access network device 130 may be access network devices that communicate with a terminal device. An access network device may provide communication coverage for a certain geographic area and may communicate with a terminal device (e.g. a UE) located within the coverage. For example, the access network device 120 may correspond to a cell 121, and a terminal device located in the cell 121 communicates with the access network device 120. For another example, the access network device 130 may correspond to a cell 131, and a terminal device located in the cell 131 communicates with the access network device 130. Optionally, a hotspot area 122 of the terminal device exists at a boundary position of the cell 121.

In the present disclosure, how the hotspot area 122 is covered can be adjusted by CCO. For example, the coverage of the cell 121 and the coverage of the cell 131 can be adjusted so that the hotspot area 122 is no longer located at the boundary of the cell 121.

As illustrated in FIG. 1, by means of CCO, the coverage of the cell 121 is expanded and the coverage of the cell 131 is reduced, so that the location of the hotspot area 122 is closer to a central area of the cell 121.

As an example, the access network device 120 and the access network device 130 referred to above may be Evolutional Node B (eNB or eNodeB) in a Long Term Evolution (LTE) system, a Next Generation radio access network (NG RAN) device, a next generation Node B (gNB) in a NR system, or a wireless controller in a Cloud radio access network (CRAN), or the network device 120 may be a relay station, an access point, a vehicle-mounted device, a wearable device, a hub, a switch, a bridge, a router, or a network device in a future evolved Public Land Mobile Network (PLMN), etc.

The terminal device may be any terminal device including but not limited to a terminal device in wired or wireless connection with an access network device or other terminal device.

For example, the terminal device may be an access terminal, a User Equipment (UE), a user unit, a user station, a mobile station, a mobile device, a remote station, a remote terminal, a mobile device, a user terminal, a terminal, a wireless communication device, a user agent, or a user apparatus. Optionally, the access terminal can be a cellular phone, a cordless phone, a Session Initiation Protocol (SIP) phone, a Wireless Local Loop (WLL) station, a Personal Digital Assistant (PDA), a handheld device or a computing device having a wireless communication function or another processing device connected to a wireless modem, a vehicle-mounted device, a wearable device, a terminal device in a 5G network, or a terminal device in a future evolved network, etc.

The terminal device may be used for device to device (D2D) communication.

As illustrated in FIG. 1, the wireless communication system may also include a core network device 110 that is communicable with the access network device 120 and the access network device 130. The core network device 110 may be a 5G Core (5GC) device, such as an Access and Mobility Management Function (AMF), an Authentication Server Function (AUSF), a User Plane Function (UPF), or a Session Management Function (SMF). Optionally, the core network device 110 may also be an Evolved Packet Core (EPC) device of the LTE network, for example, a Session Management Function+Core Packet Gateway (SMF+PGW-C) device. It should be understood that SMF+PGW-C can realize the functions of both SMF and PGW-C. In the process of network evolution, the above-mentioned core network devices may also be called other names, or a new network entity may be formed by dividing the functions of the core network, which is not limited by the embodiments of the present disclosure.

Each functional unit in the communication system 100 may also establish a connection via a next generation (NG) interface to realize communication.

For example, the terminal device may establish an air interface connection with the access network device through an NR interface, to transmit user plane data and control plane signaling. The terminal device may establish a control plane signaling connection with AMF through an NG interface 1 (N1 for short). The access network device, such as a next generation radio access base station (gNB) may establish a user plane data connection with a UPF through an NG interface 3 (N3 for short). The access network device may establish a control plane signaling connection with AMF through an NG interface 2 (N2 for short); UPF may establish a control plane signaling connection with SMF through an NG interface 4 (N4 for short); UPF may exchange user plane data with a data network through an NG interface 6 (N6 for short); AMF may establish a control plane signaling connection with SMF through an NG interface 11 (N11 for short); SMF may establish a control plane signaling connection with PCF through an NG Interface 7 (N7 for short).

FIG. 1 is only an example of the present disclosure and should not be understood as limiting the present disclosure. For example, optionally, the wireless communication system 100 may include a plurality of access network devices, and other numbers of terminal devices may be included within the coverage of each access network device. As another example, optionally, the access network device 120 and the access network device 130 may be connected to different core network devices. For example, the access network device 130 may be connected to a 5G core network device and the access network device 130 may be connected to a 4G core network device.

It should be understood that devices having communication functions in the network/system in the embodiments of the present disclosure may all be referred to as communication devices. Taking the communication system 100 illustrated in FIG. 1 as an example, communication devices may include the access network device 120, the access network device 130, and a terminal device with communication functions. The communication device may also include other devices in the communication system 100, such as a network controller, a mobility management entity, and other network entities, which are not limited in embodiments of the present disclosure.

Figure 2:
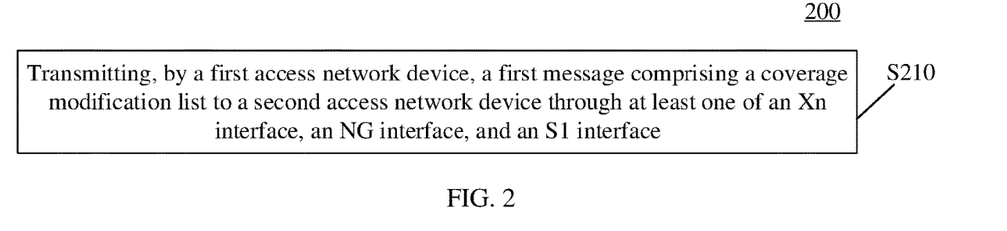
FIG. 2 is a schematic flowchart illustrating a wireless communication method according to an embodiment of the present disclosure.

FIG. 2 is a schematic flowchart illustrating a wireless communication method 200 according to an embodiment of the present disclosure. The method 200 may be performed by an access network device, such as the access network device 120 or the access network device 130 illustrated in FIG. 1.

As illustrated in FIG. 2, the Method 200 may include S210.

At S210, a first access network device transmits a first message including a coverage modification list to a second access network device through at least one of an Xn interface, an NG interface, and an S1 interface.

The first access network device transmits the first message including the coverage modification list to the second access network device through at least one of the Xn interface, the NG interface, and the S1 interface. That is, the first access network device and the second access network device may exchange the first message directly or via a core network device. In this way, introduction of a management device specially used to transmit the first message can be avoided, thereby reducing the optimization cost of CCO. In addition, applicability to different communication scenarios can be achieved to support intra-system CCO within a system and inter-system CCO, and the applicability of CCO can be improved accordingly.

For example, the first message is a configuration update message.

In other words, the first access network device and the second access network device exchange the configuration update message including the coverage modification list, so that CCO can be implemented.

In some embodiments of the present disclosure, the coverage modification list includes at least one of: an identifier of a first cell whose coverage needs to be adjusted; information indicating a coverage status of the first cell; information indicating whether a cell deployment status is applied at a next reconfiguration; an identifier of a replacing cell; and an Synchronization Signal/Physical Broadcast Channel Block (SSB) status list corresponding to the first cell.

The information indicating whether a cell deployment status is applied at a next reconfiguration can also be referred to as a Cell Deployment Status Indicator. For example, the first message may include the identifier of a replacing cell, when the information indicating whether a cell deployment status is applied at a next reconfiguration is present.

For example, the SSB status list includes at least one identifier of at least one SSB corresponding to the first cell and whose coverage needs to be adjusted, and/or at least one piece of information indicating at least one status of the at least one SSB respectively. Optionally, any one piece of information from the at least one piece of information indicates, through a first value, that a status of an SSB corresponding to said any one piece of information is an inactive status; and/or, any one piece of information from the at least one piece of information indicates, through a second value or a first type, that the status of the SSB corresponding to said any one piece of information is an active status and/or an coverage configuration of the SSB corresponding to said any one piece of information. For example, any one of the at least one identifier of the at least one SSB is an integer. For example, a value range of any one piece of information from the at least one piece of information is from 0 to 15. Optionally, the first value is 0, and the second value ranges from 1 to 15. Of course, the above values are only examples and are not to be understood as limiting the present disclosure.

In some embodiments of the present disclosure, the first type includes at least one of a high coverage type, a medium coverage type, and a low coverage type.

For example, any one piece of information from the at least one piece of information indicates, through a high coverage type, that the status of the SSB corresponding to said any one piece of information is an active status and/or an coverage configuration of the SSB corresponding to said any one piece of information.

In other words, any one piece of information from the at least one piece of information indicates, through at least one of the high coverage type, the medium coverage type and the low coverage type, the coverage configuration of the SSB corresponding to the at least one piece of information, and in this case, the status of the SSB corresponding to the at least one piece of information is defaulted to the active state.

In some embodiments of the present disclosure, the identifier of the first cell is an Evolved Universal Terrestrial radio access network Cell Global Identifier (ECGI), or the identifier of the first cell is a New Radio Cell Global Identifier (NCGI).

Figure 3:
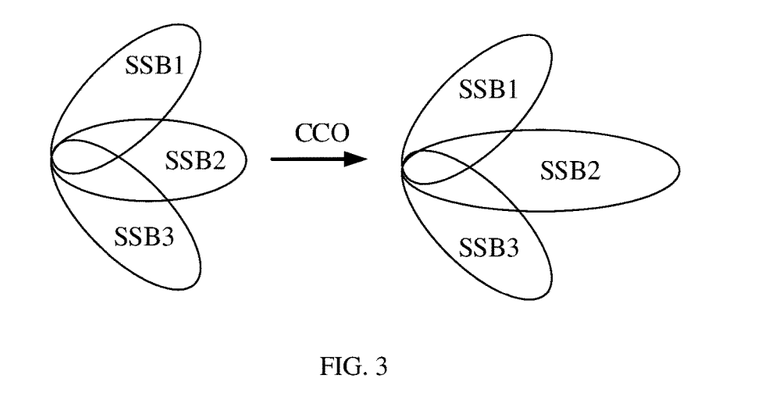
FIG. 3 is a schematic diagram showing a CCO-based modification of SSB coverage according to an embodiment of the present disclosure.

FIG. 3 is a schematic diagram showing a CCO-based modification of SSB coverage according to an embodiment of the present disclosure.

As illustrated in FIG. 3, the first access network device determines that the cell whose coverage needs to be modified corresponds to three SSBs: SSB1, SSB2 and SSB3, and only the coverage of SSB3 is modified. The first message transmitted by the first access network device to the second access network device may only include the identifier of the SSB3 and the coverage configuration of the SSB3, so that the second access network device modifies the coverage of the SSB that is opposite in direction to the SSB3 based on the identifier of the SSB3 and the coverage configuration of the SSB3 in the first message.

In other words, the first message may only include the identifier of at least one SSB whose coverage needs to be adjusted corresponding to the cell whose coverage needs to be modified. That is, only the coverage of the at least one SSB is modified, thus avoiding modifying the coverage of the cell.

In other words, the first access network device may not inform the second access network device of the coverage of the cell, but choose to inform the second access network device of the modification of the coverage of at least one SSB in the cell.

It should be noted that in 5G NR, in view of higher deployment frequency, in order to expand the coverage, SSBs including Demodulation Reference Signal (DMRS) and primary synchronization, secondary synchronization, and MIB are no longer transmitted omni-directionally, but are transmitted in a certain direction at each moment. For example, several SSBs can be transmitted within a certain half frame every once in a while for beam scanning on terminals. For example, each of the plurality of SSBs corresponds to a beam scanning direction, and eventually there will be an SSB in each direction, and the plurality of SSBs may also be referred to as an SSB set. In other words, all SSBs in the one SSB set are within the same half frame. Optionally, the period of the SSB set may be 5 ms, 10 ms, 20 ms, 40 ms, 80 ms, 160 ms. Optionally, the period of the SSB set may be indicated in SIB1. Optionally, when initially searching for a cell, i.e. when the terminal device has not received SIB1, the terminal device can search for SSB at a default period of 20 ms. Optionally, SSBs in different directions can correspond to different SSB-indexes.

Based on this, it can be found that the coverage of each SSB can not only determine a coverage of control plane signaling, but also determine a coverage of data channel. Therefore, in the embodiments of the present disclosure, by modifying the coverage of the SSB, an optimization granularity of CCO can be refined, and correspondingly, an optimization effect of CCO can be improved.

In some embodiments of the present disclosure, a communication system to which the first access network device belongs and a communication system to which the second access network device belongs are the same communication system. For example, both the first access network device and the second access network device are connected to a same core network element. As an example of the present disclosure, an Xn interface is supported or not supported between the first access network device and the second access network device.

In some embodiments of the present disclosure, S210 may include: transmitting, by the first access network device, the first message to the second access network device through the Xn interface.

For example, if the communication system to which the first access network device belongs and the communication system to which the second access network device belongs are the same communication system, the first access network device transmits the first message to the second access network device through the Xn interface. For example, if both the first access network device and the second access network device are connected to the same core network element, and the Xn interface is supported between the first access network device and the second access network device, the first access network device transmits the first message to the second access network device through the Xn interface.

Figure 4:
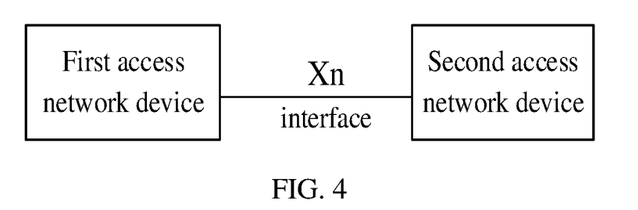
FIG. 4 and FIG. 5 are schematic structural diagrams showing the connection relationship between the first access network device and the second access network device according to embodiments of the present disclosure.

FIG. 4 is a schematic structural diagram showing the connection relationship between the first access network device and the second access network device according to an embodiment of the present disclosure.

As illustrated in FIG. 4, the first access network device and the second access network node are both 5G radio access network nodes, and the first access network device can be connected to the second access network device through an Xn interface.

For example, the first access network device may transmit a 5G radio access network node configuration update (NG-RAN node configuration update) message carrying a coverage modification list to the second access network device through the Xn interface, so that the second access network device adjusts the cell coverage of the second access network device.

Since both the first access network device and the second access network device can be ng-eNB or gNB, a cell ID of the cell of the first access network device, i.e. Evolved Universal Terrestrial radio access network Cell Global Identifier (ECGI) or New Radio Cell Global Identifier (NCGI), needs to be provided in the coverage modification list. For ECGI, the coverage modification list may include at least one of: an identifier of a first cell whose coverage needs to be adjusted; information indicating a coverage status of the first cell; information indicating whether a cell deployment status is applied at a next reconfiguration; an identifier of a replacing cell. For NGCI, the coverage modification list may include coverage status indications of all SSBs or at least coverage status indications and corresponding index numbers of SSBs whose coverage needs to be modified.

Of course, if the communication system to which the first access network device belongs and the communication system to which the second access network device belongs are the same communication system, the first access network device can also transmit the first message to the second access network device through the NG interface or the S1 interface. For example, if both the first access network device and the second access network device are connected to the same core network element, and the Xn interface is not supported between the first access network device and the second access network device, the first access network device can also transmit the first message to the second access network device through the NG interface or the S1 interface.

In some embodiments of the present disclosure, the communication system to which the first access network device belongs and the communication system to which the second access network device belongs are different communication systems. Optionally, the different communication systems may mean that the first access device and the second access network device are connected to two different core network elements, respectively. For example, the different communication systems may mean that the first access device and the second access network device are connected to AMF and EPC, respectively. In other words, information exchange between the first access network device and the second access device can only take place through the S1 interface and NG interface.

In some embodiments of the present disclosure, the first access network device is a 5th-Generation (5G) access network device. S210 may include: transmitting, by the first access network device, the first message to Access and Mobility Management Function (AMF) through the NG interface.

In some embodiments of the present disclosure, the first access network device is a 4th-Generation (4G) access network device. S210 may include: transmitting, by the first access network device, the first message to MME through the S1 interface, or to AMF through the NG interface.

Figure 5:
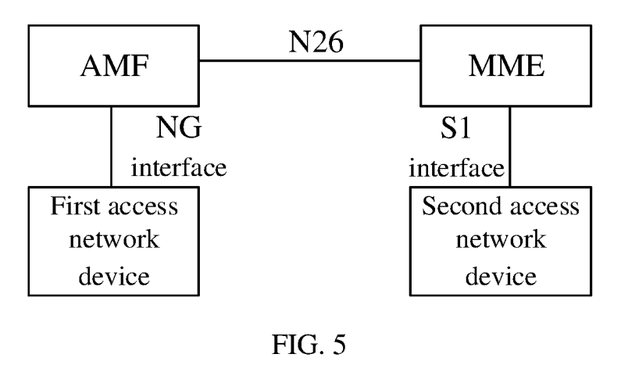

FIG. 5 is schematic structural diagram showing the connection relationship between the first access network device and the second access network device according to another embodiment of the present disclosure.

As illustrated in FIG. 5, assuming that the first access network device is a 5G access network device, and the second access network device is a 4G access network device. The first access network device transmits the first message to AMF through the NG interface, so that the AMF transmits the first message to the Mobility Management Entity (MME) through the N26 interface, and further the MME transmits the first message to the second access network device through the S1 interface.

For example, the first access network device may transmit a 5G radio access network node configuration update (NG-RAN node configuration update) message carrying the coverage modification list to AMF through the NG interface, so that the AMF transmits the radio access network node configuration update message to MME through the N26 interface. Further, the MME transmits the radio access network node configuration update message to the second access network device, and the second access network device adjusts the cell coverage of the second access network device based on the radio access network node configuration update message.

Since both the first access network device and the second access network device can be ng-eNB or gNB, the cell ID of the cell of the first access network device, i.e. Evolved Universal Terrestrial Radio Access Network Cell Global Identifier (ECGI) or New Radio Cell Global Identifier (NCGI), needs to be provided in the coverage modification list. For ECGI, the coverage modification list may include at least one of: an identifier of a first cell whose coverage needs to be adjusted; information indicating a coverage status of the first cell; information indicating whether a cell deployment status is applied at a next reconfiguration; an identifier of a replacing cell. For NGCI, the coverage modification list may include coverage status indications of all SSBs or at least coverage status indications and corresponding index numbers of SSBs whose coverage needs to be modified.

Of course, if the first access network device is a 4G access network device, and the second access network device is a 5G access network device, the first access network device can transmit the first message to the MME through the S1 interface, so that the MME can pass the first message to the AMF through the N26 interface, and then the AMF can transmit the first message to the second access network device through the NG interface.

Preferred embodiments of the present disclosure have been described in detail with reference to the accompanying drawings, but the present disclosure is not limited to the specific details of the above embodiments. Within the scope of the technical conception of the present disclosure, various simple modifications can be made to the technical solution of the present disclosure, and these simple modifications all belong to the scope of protection of the present disclosure. For example, the specific technical features described in the above specific embodiments may be combined in any suitable manner without contradiction, and various possible combinations are not further described in the present disclosure in order to avoid unnecessary repetition. For example, any combination may be made between the various embodiments of the present disclosure, and should also be regarded as the content disclosed by the present disclosure as long as it does not violate the idea of the present disclosure.

It should also be understood that in the various method embodiments of the present disclosure, the sequence numbers of the above-mentioned processes do not suggest the order of execution which should be determined by their functions and inherent logic, and by no mean limit the implementation process of the embodiments of the present disclosure. In addition, in the embodiments of the present disclosure, the term "and/or" as used herein only represents a relationship between correlated objects, including three relationships. Specifically, "A and/or B" may mean A only, both A and B, or B only. In addition, the symbol "/" as used herein represents an "or" relationship between the correlated objects preceding and succeeding the symbol.

The wireless communication method according to embodiments of the present disclosure has been described in detail from a perspective of the first access network device above with reference to FIG. 2 to FIG. 5, and the wireless communication method according to an embodiment of the present disclosure will be described from the perspective of a second access network device below with reference to FIG. 6.

Figure 6:
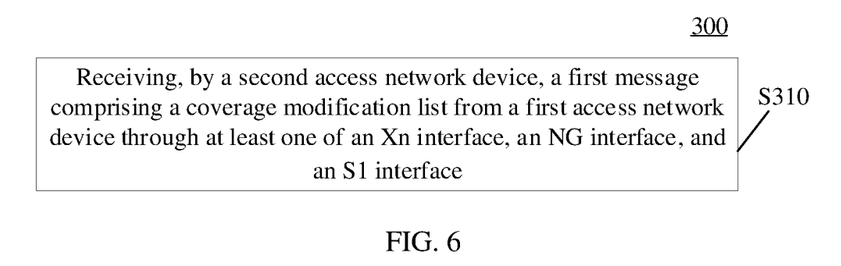
FIG. 6 is another schematic flowchart illustrating a wireless communication method according to an embodiment of the present disclosure.

FIG. 6 is another schematic flowchart illustrating a wireless communication method 300 according to an embodiment of the present disclosure. The method 200 may be performed by an access network device, such as the access network device 120 or the access network device 130 illustrated in FIG. 1.

As illustrated in FIG. 6, the method 300 may include S310.

At S310, a second access network device receives a first message including a coverage modification list from a first access network device through at least one of an Xn interface, an NG interface, and an S1 interface.

In some embodiments of the present disclosure, the coverage modification list includes at least one of: an identifier of a first cell whose coverage needs to be adjusted; information indicating a coverage status of the first cell; information indicating whether a cell deployment status is applied at a next reconfiguration; an identifier of a replacing cell; and an Synchronization Signal/Physical Broadcast Channel Block (SSB) status list corresponding to the first cell.

For example, the second access network device may make corresponding coverage modifications for a neighboring cell of the first cell based on the first message. For example, the second access network device may modify the coverage of the neighboring cell based on the coverage of the first cell. For example, the coverage of the first cell may be determined by previously collected downlink channel quality of the first cell. For example, the coverage of the first cell may be determined based on measurement results of measurements, such as a Downlink Reference Signal Receiving Power (RSRP), for the first cell reported by terminal devices at various locations.

In some embodiments of the present disclosure, the SSB status list includes at least one identifier of at least one SSB corresponding to the first cell and whose coverage needs to be adjusted, and/or at least one piece of information indicating at least one status of the at least one SSB respectively.

In some embodiments of the present disclosure, the identifier of the first cell is the Evolved Universal Terrestrial Radio Access Network Cell Global identifier (ECGI), or the identifier of the first cell is the New Air Interface Cell Global identifier (NCGI).

In some embodiments of the present disclosure, any one piece of information from the at least one piece of information indicates, through a first value, that a status of an SSB corresponding to said any one piece of information is an inactive status; and/or, any one piece of information from the at least one piece of information indicates, through a second value or a first type, that the status of the SSB corresponding to said any one piece of information is an active status and/or an coverage configuration of the SSB corresponding to said any one piece of information.

In some embodiments of the present disclosure, the first type includes at least one of a high coverage type, a medium coverage type, and a low coverage type.

In some embodiments of the present disclosure, a communication system to which the first access network device belongs and a communication system to which the second access network device belongs are the same communication system.

In some embodiments of the present disclosure, S310 may include: receiving, by the second access network device, the first message from the first access network device through the Xn interface.

In some embodiments of the present disclosure, a communication system to which the first access network device belongs and a communication system to which the second access network device belongs are different communication systems.

In some embodiments of the present disclosure, the second access network device is a 5th-Generation (5G) access network device. S310 may include: receiving, by the second access network device, the first message from Access and Mobility Management Function (AMF) through the NG interface.

In some embodiments of the present disclosure, the second access network device is a 4th-Generation (4G) access network device. S310 may include: receiving, by the second access network device, the first message from Mobility Management Entity (MME) through the S1 interface, or from Access and Mobility Management Function (AMF) through the NG interface.

In some embodiments of the present disclosure, the first message is a configuration update message.

It should be understood that, for the steps in the method 200, reference may be made to the corresponding steps in the method 200 described above and will not be repeated here for the sake of brevity.

The method embodiments of the present disclosure are described in detail above with reference to FIG. 1 to FIG. 6, and the apparatus embodiments of the present disclosure are described in detail below with reference to FIG. 7 to FIG. 10.

Figure 7:
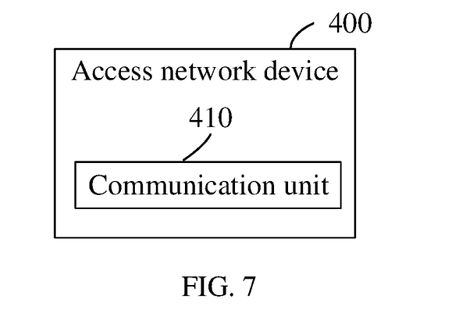
FIG. 7 and FIG. 8 are schematic block diagrams showing access network devices according to embodiments of the present disclosure.

FIG. 7 is a schematic block diagram showing an access network device 400 according to an embodiment of the present disclosure.

As illustrated in FIG. 7, the access network device 400 may include a communication unit 410.

The communication unit 410 is configured to transmit a first message including a coverage modification list to a second access network device through at least one of an Xn interface, an NG interface, and an S1 interface.

In some embodiments of the present disclosure, the coverage modification list includes at least one of: an identifier of a first cell whose coverage needs to be adjusted; information indicating a coverage status of the first cell; information indicating whether a cell deployment status is applied at a next reconfiguration; an identifier of a replacing cell; and an Synchronization Signal/Physical Broadcast Channel Block (SSB) status list corresponding to the first cell.

In some embodiments of the present disclosure, the SSB status list includes at least one identifier of at least one SSB corresponding to the first cell and whose coverage needs to be adjusted, and/or at least one piece of information indicating at least one status of the at least one SSB respectively.

In some embodiments of the present disclosure, any one piece of information from the at least one piece of information indicates, through a first value, that a status of an SSB corresponding to said any one piece of information is an inactive status; and/or, any one piece of information from the at least one piece of information indicates, through a second value or a first type, that the status of the SSB corresponding to said any one piece of information is an active status and/or an coverage configuration of the SSB corresponding to said any one piece of information.

In some embodiments of the present disclosure, the first type includes at least one of a high coverage type, a medium coverage type, and a low coverage type.

In some embodiments of the present disclosure, the identifier of the first cell is Evolved Universal Terrestrial Radio Access Network Cell Global Identifier (ECGI), or New Radio Cell Global Identifier (NCGI).

In some embodiments of the present disclosure, a communication system to which the first access network device belongs and a communication system to which the second access network device belongs are the same communication system.

In some embodiments of the present disclosure, the communication unit 410 is specifically configured to transmit the first message to the second access network device through the Xn interface.

In some embodiments of the present disclosure, a communication system to which the first access network device belongs and a communication system to which the second access network device belongs are different communication systems.

In some embodiments of the present disclosure, the first access network device is a 5th-Generation (5G) access network device. The communication unit 410 is specifically configured to transmit the first message to Access and Mobility Management Function (AMF) through the NG interface.

In some embodiments of the present disclosure, the first access network device is a 4th-Generation (4G) access network device. The communication unit 410 is specifically configured to: transmit the first message to Mobility Management Entity (MME) through the S1 interface, or to Access and Mobility Management Function (AMF) through the NG interface.

In some embodiments of the present disclosure, the first message is a configuration update message.

It should be understood that the apparatus embodiments and the method embodiments may correspond to each other, and similar descriptions can be found in the method embodiments. Specifically, the access network device 400 shown in FIG. 7 may correspond to a device in the method 200 for performing the embodiments of the present disclosure, and the aforementioned and other operations and/or functions of individual units in the access network device 400 are respectively used to implement the corresponding processes in the method illustrated in FIG. 2, which will not be repeated here for the sake of brevity.

Figure 8:
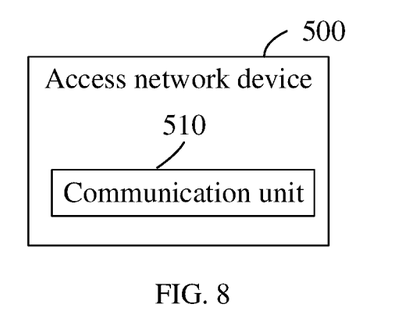

FIG. 8 is a schematic block diagram showing an access network device 500 according to an embodiment of the present disclosure.

As illustrated in FIG. 8, the access network device 500 may include a communication unit 510.

The communication unit 510 is configured to receive a first message including a coverage modification list from a first access network device through at least one of an Xn interface, an NG interface, and an S1 interface.

In some embodiments of the present disclosure, the coverage modification list includes at least one of: an identifier of a first cell whose coverage needs to be adjusted; information indicating a coverage status of the first cell; information indicating whether a cell deployment status is applied at a next reconfiguration; an identifier of a replacing cell; and an Synchronization Signal/Physical Broadcast Channel Block (SSB) status list corresponding to the first cell.

In some embodiments of the present disclosure, the SSB status list includes at least one identifier of at least one SSB corresponding to the first cell and whose coverage needs to be adjusted, and/or at least one piece of information indicating at least one status of the at least one SSB respectively.

In some embodiments of the present disclosure, the identifier of the first cell is Evolved Universal Terrestrial Radio Access Network Cell Global Identifier (ECGI) or New Radio Cell Global Identifier (NCGI).

In some embodiments of the present disclosure, any one piece of information from the at least one piece of information indicates, through a first value, that a status of an SSB corresponding to said any one piece of information is an inactive status; and/or, any one piece of information from the at least one piece of information indicates, through a second value or a first type, that the status of the SSB corresponding to said any one piece of information is an active status and/or an coverage configuration of the SSB corresponding to said any one piece of information.

In some embodiments of the present disclosure, the first type includes at least one of a high coverage type, a medium coverage type, and a low coverage type.

In some embodiments of the present disclosure, a communication system to which the first access network device belongs and a communication system to which the second access network device belongs are the same communication system.

In some embodiments of the present disclosure, the communication unit 510 is specifically configured to receive the first message from the first access network device through the Xn interface.

In some embodiments of the present disclosure, a communication system to which the first access network device belongs and a communication system to which the second access network device belongs are different communication systems.

In some embodiments of the present disclosure, the second access network device is a 5th-Generation (5G) access network device. The communication unit 510 is specifically configured to receive the first message from Access and Mobility Management Function (AMF) through the NG interface.

In some embodiments of the present disclosure, the second access network device is a 4th-Generation (4G) access network device. The communication unit 510 is specifically configured to receive the first message from Mobility Management Entity (MME) through the S1 interface, or from Access and Mobility Management Function (AMF) through the NG interface.

In some embodiments of the present disclosure, the first message is a configuration update message.

It should be understood that the apparatus embodiments and the method embodiments may correspond to each other and similar descriptions can be found in the method embodiments. In particular, the access network device 500 illustrated in FIG. 8 may correspond to a subject in the method 300 for performing the embodiments of the present disclosure, and the aforementioned and other operations and/or functions of individual units in the access network device 500 are respectively used to implement the corresponding processes in the method illustrated in FIG. 6, which will not be repeated here for the sake of brevity.

The communication device of the embodiments of the present disclosure is described above in terms of functional modules with reference to the accompanying drawings. It should be understood that the functional modules may be implemented in hardware, or through software instructions, or through a combination of hardware and software modules.

In particular, steps of the method embodiments in the embodiments of the present disclosure may be accomplished by integrated logic circuitry of hardware in the processor and/or instructions in the form of software. The steps of the methods disclosed in the embodiments of the present disclosure may be directly embodied as being performed and completed by a hardware decoding processor, or by a combination of hardware and software modules in the decoding processor.

Optionally, the software modules can be located in a known storage medium in the related art, such as random access memory, flash memory, read-only memory, programmable read-only memory, electrically erasable programmable memory, or register. The storage medium can be located in the memory, and the processor can read information from the memory and perform the steps of the above method embodiments in combination with its hardware.

For example the processing unit and the communication unit referred to above may be implemented by a processor and a transceiver respectively.

Figure 9:
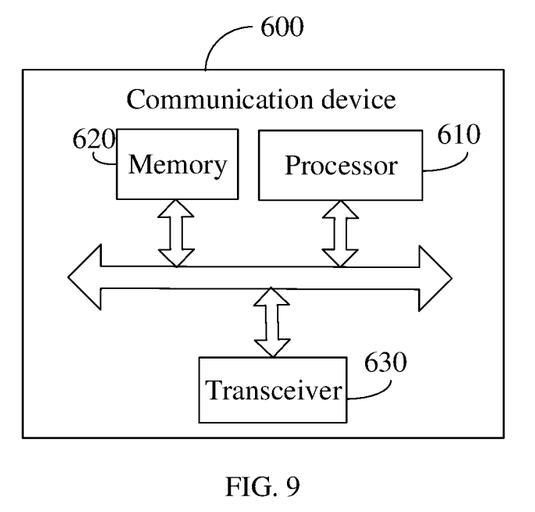
FIG. 9 is a schematic block diagram showing a communication device according to an embodiment of the present disclosure.

FIG. 9 is a schematic block diagram showing a communication device 600 according to an embodiment of the present disclosure.

As illustrated in FIG. 9, the communication device 600 may include a processor 610.

The processor 610 may invoke and run a computer program from memory to implement the method according to embodiments of the present disclosure.

Continuing to refer to FIG. 9, the communication device 600 may also include a memory 620.

The memory 620 may be used for storing indication information and may also be used for storing codes, instructions, and the like executed by the processor 610. The processor 610 may invoke and run a computer program from the memory 620 to implement the method according to the embodiments of the present disclosure. The memory 620 may be a separate device independent of the processor 610, or may be integrated in the processor 610.

Continuing to refer to FIG. 9, the communication device 600 may also include a transceiver 630.

The processor 610 may control the transceiver 630 to communicate with other devices. Specifically, the transceiver 630 may transmit information or data to or receive information or data from other devices. The transceiver 630 may include a transmitter and a receiver. The transceiver 630 may further include one or more antennas.

It should be understood that the various components in the communication device 600 are connected by a bus system. In addition to the data bus, the bus system also includes a power bus, a control bus, and a status signal bus.

It should also be understood that the communication device 600 may be the first access network device according to embodiments of the present disclosure, and the communication device 600 may implement corresponding processes implemented by the first access network device in the methods according to the embodiments of the present disclosure. That is, the communication device 600 according to the embodiments of the present disclosure may correspond to the access network device 400 according to the embodiments of the present disclosure and may correspond to a subject executing the method 200 according to the embodiments of the present disclosure, which will not be repeated here for the sake of brevity. Similarly, the communication device 600 may be the second access network device according to embodiments of the present disclosure, and the communication device 600 may implement corresponding processes implemented by the second access network device in the methods according to the embodiments of the present disclosure. That is, the communication device 600 according to the embodiments of the present disclosure may correspond to the access network device 500 according to the embodiments of the present disclosure and may correspond to a subject executing the method 300 according to the embodiments of the present disclosure, which will not be repeated here for the sake of brevity.

In addition, a chip is also provided according to an embodiment of the present disclosure.

For example, the chip may be an integrated circuit chip having signal processing capabilities that can implement or perform the methods, steps, and logic diagrams disclosed in embodiments of the present disclosure. The chip may also be called a system-level chip, a system-chip, a chip system, or a system-on-chip. Optionally, the chip can be applied to various communication devices so that the communication devices provided with the chip can perform the methods, steps, and logic block diagrams disclosed in embodiments of the present disclosure.

Figure 10:
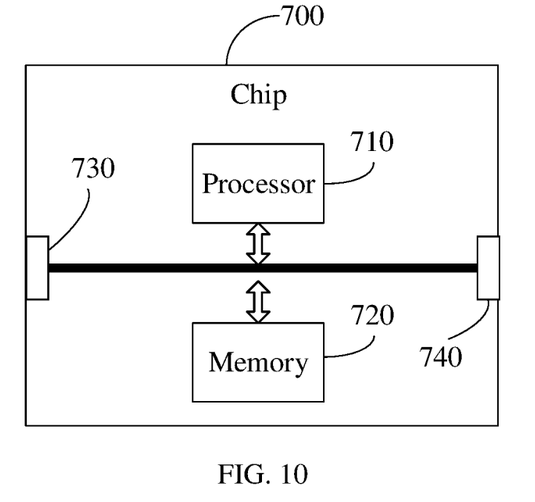
FIG. 10 is a schematic block diagram showing a chip according to an embodiment of the present disclosure.

FIG. 10 is a schematic block diagram showing a chip 700 according to an embodiment of the present disclosure.

As illustrated in FIG. 10, the chip 700 includes a processor 710.

The processor 710 may invoke and run a computer program from memory to implement the method according to embodiments of the present disclosure.

Continuing to refer to FIG. 10, the chip 700 may also include a memory 720.

The processor 710 may invoke and run a computer program from the memory 720 to implement the method according to the embodiments of the present disclosure. The memory 720 may be used to store indication information and may also be used to store codes, instructions, and the like executed by the processor 710. The memory 720 may be a separate device independent of the processor 710, or may be integrated in the processor 710.

Continuing to refer to FIG. 10, the chip 700 may also include an input interface 730.

The processor 710 may control the input interface 730 to communicate with other devices or chips and in particular may obtain information or data transmitted by other devices or chips.

Continuing to refer to FIG. 10, the chip 700 may also include an output interface 740.

The processor 710 may control the output interface 740 to communicate with other devices or chips and in particular may output information or data to other devices or chips.

It should be understood that the chip 700 may be applied to an access network device according to embodiments of the present disclosure, and the chip may implement the corresponding procedures implemented by the access network device in the methods according to the embodiments of the present disclosure, and may also implement the corresponding procedures implemented by the access network device in the methods according to the embodiments of the present disclosure, which will not be repeated here for the sake of brevity.

It should also be understood that the various components in the chip 700 are connected by a bus system. In addition to the data bus, the bus system also includes a power bus, a control bus, and a status signal bus.

The processors referred to above may include, but are not limited to, a general purpose processor, a Digital Signal Processor (DSP), an Application Specific Integrated Circuit (ASIC), a Field Programmable Gate Array (FPGA) or another programmable logic device, a discrete gate or transistor logic device, a discrete hardware component, and the like.

The methods, steps, and logical block diagrams disclosed in the embodiments of the present disclosure can be implemented or performed by the processor. The steps of the methods disclosed in the embodiments of the present disclosure may be directly embodied as being performed and completed by a hardware decoding processor, or by a combination of hardware and software modules in the decoding processor. The software modules can be located in a known storage medium in the related art, such as random access memory, flash memory, read-only memory, programmable read-only memory, erasable programmable memory, or register. The storage medium can be located in the memory, and the processor can read information from the memory and perform the steps of the above methods in combination with its hardware.

The memory mentioned above includes, but is not limited to, a volatile memory or a non-volatile memory. Here, the non-volatile memory may be a Read-Only Memory (ROM), a Programmable ROM (PROM), an Erasable PROM (EPROM), an Electrically EPROM (EEPROM), or a flash memory. The volatile memory may be a Random Access Memory (RAM), which is used as an external cache. As illustrative, rather than limiting, examples, many forms of RAMs are available, including Static RAM (SRAM), Dynamic RAM (DRAM), Synchronous DRAM (SDRAM), Double Data Rate SDRAM (DDR SDRAM), Enhanced SDRAM (ESDRAM), Synchlink DRAM (SLDRAM)), and Direct Rambus RAM (DR RAM).

It is to be noted that the memory described herein is intended to include these and any other suitable types of memory.

An embodiment of the present disclosure also provides a computer readable storage medium for storing computer programs. The computer-readable storage medium stores one or more programs including instructions that, when executed by a portable electronic device including a plurality of application programs, enable the portable electronic device to perform the method in the method embodiments.

Optionally, the computer-readable storage medium can be applied to the network device according to the embodiments of the present disclosure, and the computer program can cause a computer to perform the corresponding procedures implemented by the network device in the method according to the embodiments of the present disclosure, which will not repeated here for the sake of brevity.

Optionally, the computer-readable storage medium can be applied to the mobile terminal/terminal device in the embodiments of the present disclosure, and the computer program can cause a computer to perform corresponding processes implemented by the mobile terminal/terminal device in the methods according to the embodiments of the present disclosure, which will not be repeated here for the sake of brevity.

An embodiment of the present disclosure also provides a computer program product, which includes a computer program.

Optionally, the computer program product may be applied to the network device in the embodiment of the present disclosure, and the computer program can cause a computer to perform the corresponding procedures implemented by the network device in the methods according to the embodiments of the present disclosure. Details thereof will be omitted here for simplicity.

Optionally, the computer program product can be applied to the mobile terminal/terminal device in the embodiment of the present disclosure, and the computer program can cause a computer to perform the corresponding procedures implemented by the mobile terminal/terminal device in the methods according to the embodiments of the present disclosure. Details thereof will be omitted here for simplicity.

An embodiment of the present disclosure also provides a computer program. When the computer program is executed by the computer, the computer is enabled to perform the method of the method embodiments.

Optionally, the computer program can be applied to the network device in the embodiment of the present disclosure. The computer program, when executed on a computer, can cause the computer to perform the corresponding procedures implemented by the network device in the methods according to the embodiments of the present disclosure. Details thereof will be omitted here for simplicity.

In addition, an embodiment of the present disclosure also provides a communication system. The communication system may include the above-mentioned terminal device and network device to form the communication system 100 as illustrated in FIG. 1, which will not be repeated here for the sake of brevity. It should be noted that the term "system" used herein can also be referred to as "network management architecture" or "network system".

It should also be understood that the terminology used in the embodiments of the present disclosure and the appended claims is for the purpose of describing specific embodiments only and is not intended to limit the embodiments of the present disclosure.

For example, the singular forms of "a/an", "said", and "the" as used in embodiments of the present disclosure and the appended claims are also intended to include the plural forms, unless the context clearly dictates otherwise.

It can be appreciated by those skilled in the art that units and algorithm steps in the examples described in connection with the embodiments disclosed herein can be implemented in electronic hardware or any combination of computer software and electronic hardware. Whether these functions are executed by hardware or software depends on specific applications and design constraint conditions of the technical solutions. Those skilled in the art may use different methods for individual specific applications to implement the described functions, and such implementation is to be encompassed by the scope of this disclosure.

When the function is implemented in the form of a software functional unit and sold or used as a standalone product, it can be stored in a computer readable storage medium. Based on this understanding, the essence of the technical solutions according to the embodiments of the present disclosure, or the part thereof that contributes to the related art, can be embodied entirely or partially in the form of a software product. The computer software product may be stored in a storage medium and contain instructions to enable a computer device, such as a personal computer, a server, or a network device, etc., to perform all or part of the steps of the method described in each of the embodiments of the present disclosure. The storage medium may include a Universal Serial Bus flash drive, a mobile hard disk, a Read-Only Memory (ROM), a Random Access Memory (RAM), a magnetic disk, an optical disc, or any other medium capable of storing program codes.

Those skilled in the art can clearly understand that, for the convenience and conciseness of the description, for the specific operation processes of the systems, devices, and units described above, reference can be made to the corresponding processes in the foregoing method embodiments, and details thereof will be omitted here.

In the embodiments of the present disclosure, it should be appreciated that the disclosed systems, devices, and methods may be implemented in other ways.

For example, the divisions of the units, modules or components in the device embodiments described above are only divisions based on logical functions, and there may be other divisions in actual implementations. For example, more than one unit, module or component may be combined or integrated into another system, or some features can be ignored or omitted.

As another example, the units/modules/components described as separate/display components may or may not be physically separated, that is, they may be co-located or distributed across a number of network elements. Some or all of the units/modules/components may be selected according to actual needs to achieve the objects of the solutions of the embodiments.

Finally, it should be noted that the mutual coupling or direct coupling or communicative connection as shown or discussed may be indirect coupling or communicative connection between devices or units via some interfaces which may be electrical, mechanical, or in any other forms.

While the specific embodiments of the present disclosure have been described above, the scope of the present disclosure is not limited to these embodiments. Various variants and alternatives can be readily made by those skilled in the art without departing from the scope of the present disclosure. These variants and alternatives are to be encompassed by the scope of present disclosure as defined by the claims as attached.

What is claimed is:

1. A wireless communication method, comprising:
transmitting, by a first access network device, a first message comprising a coverage modification list to a second access network device through at least one of an NG interface, and an S1 interface,
wherein a communication system to which the first access network device belongs and a communication system to which the second access network device belongs are different communication systems,
wherein the first access network device is a 5th-Generation (5G) access network device; and said transmitting, by the first access network device, the first message comprising the coverage modification list to the second access network device through at least one of the NG interface, and the S1 interface comprises: transmitting, by the first access network device, the first message to Access and Mobility Management Function (AMF) through the NG interface, or
the first access network device is a 4th-Generation (4G) access network device; and said transmitting, by the first access network device, the first message comprising the coverage modification list to the second access network device through at least one of the NG interface, and the S1 interface comprises: transmitting, by the first access network device, the first message to Mobility Management Entity (MME) through the S1 interface, or to the AMF through the NG interface.

2. The method according to claim 1, wherein the coverage modification list comprises at least one of:
an identifier of a first cell whose coverage needs to be adjusted;
information indicating a coverage status of the first cell;
information indicating whether a cell deployment status is applied at a next reconfiguration;
an identifier of a replacing cell; and
an Synchronization Signal/Physical Broadcast Channel Block (SSB) status list corresponding to the first cell.

3. The method according to claim 2, wherein the SSB status list comprises at least one identifier of at least one SSB corresponding to the first cell and whose coverage needs to be adjusted, and/or at least one piece of information indicating at least one status of the at least one SSB respectively.

4. The method according to claim 3, wherein any one piece of information from the at least one piece of information indicates, through a first value, that a status of an SSB corresponding to said any one piece of information is an inactive status; and/or, any one piece of information from the at least one piece of information indicates, through a second value or a first type, that the status of the SSB corresponding to said any one piece of information is an active status and/or an coverage configuration of the SSB corresponding to said any one piece of information.

5. The method according to claim 2, wherein the identifier of the first cell is Evolved Universal Terrestrial radio access network Cell Global Identifier (ECGI) or New Radio Cell Global Identifier (NCGI).

6. A wireless communication method, comprising:
receiving, by a second access network device, a first message comprising a coverage modification list from a first access network device through at least one of an NG interface, and an S1 interface,
wherein a communication system to which the first access network device belongs and a communication system to which the second access network device belongs are different communication systems,
wherein the second access network device is a 5th-Generation (5G) access network device; and said receiving, by the second access network device, the first message comprising the coverage modification list from the first access network device through at least one of the NG interface, and the S1 interface comprises: receiving, by the second access network device, the first message from Access and Mobility Management Function (AMF) through the NG interface, or the second access network device is a 4th-Generation (4G) access network device; and said receiving, by the second access network device, the first message comprising the coverage modification list from the first access network device through at least one of the NG interface, and the S1 interface comprises: receiving, by the second access network device, the first message from Mobility Management Entity (MME) through the S1 interface, or from AMF through the NG interface.

7. The method according to claim 6, wherein the coverage modification list comprises at least one of:
an identifier of a first cell whose coverage needs to be adjusted;
information indicating a coverage status of the first cell;
information indicating whether a cell deployment status is applied at a next reconfiguration;
an identifier of a replacing cell; and
an Synchronization Signal/Physical Broadcast Channel Block (SSB) status list corresponding to the first cell.

8. The method according to claim 7, wherein the SSB status list comprises at least one identifier of at least one SSB corresponding to the first cell and whose coverage needs to be adjusted, and/or at least one piece of information indicating at least one status of the at least one SSB respectively.

9. The method according to claim 8, wherein any one piece of information from the at least one piece of information indicates, through a first value, that a status of an SSB corresponding to said any one piece of information is an inactive status; and/or, any one piece of information from the at least one piece of information indicates, through a second value or a first type, that the status of the SSB corresponding to said any one piece of information is an active status and/or an coverage configuration of the SSB corresponding to said any one piece of information.

10. The method according to claim 7, wherein the identifier of the first cell is Evolved Universal Terrestrial radio access network Cell Global Identifier (ECGI) or New Radio Cell Global Identifier (NCGI).

11. An access network device comprising:
a transceiver,
a memory for storing a computer program, and
a processor configured to invoke and execute the computer program stored in the memory to cause the transceiver to:
transmit a first message comprising a coverage modification list to a second access network device through at least one of an NG interface, and an S1 interface,
wherein a communication system to which the first access network device belongs and a communication system to which the second access network device belongs are different communication systems,
wherein the first access network device is a 5th-Generation (5G) access network device; and said transmitting, by the first access network device, the first message comprising the coverage modification list to the second access network device through at least one of the NG interface, and the S1 interface comprises: transmitting, by the first access network device, the first message to Access and Mobility Management Function (AMF) through the NG interface, or
the first access network device is a 4th-Generation (4G) access network device; and said transmitting, by the first access network device, the first message comprising the coverage modification list to the second access network device through at least one of the NG interface, and the S1 interface comprises: transmitting, by the first access network device, the first message to Mobility Management Entity (MME) through the S1 interface, or to the AMF through the NG interface.

12. An access network device comprising:
a transceiver,
a memory for storing a computer program, and
a processor configured to invoke and execute the computer program stored in the memory to perform the method according to claim 6.

* * * * *